United States Patent [19]

Morimoto et al.

[11] Patent Number: 4,904,128

[45] Date of Patent: Feb. 27, 1990

[54] HIGH-DENSITY PNEUMATIC TRANSPORT METHOD FOR USE IN POWDER OR GRANULAR MATERIAL AND SYSTEM FOR PRACTISING THE METHOD

[75] Inventors: Kiyoshi Morimoto, Mishima; Akikazu Iwamoto, Sunto; Masuo Moriyama, Numazu; Atsuroh Sonoda, Hirakata, all of Japan

[73] Assignees: Kyowa Hakko Kogyo Co., Ltd., Tokyo; Kabushiki Kaisha Matsui Seisakusho, Osaka, both of Japan

[21] Appl. No.: 112,105

[22] Filed: Oct. 20, 1987

[30] Foreign Application Priority Data

Oct. 21, 1986 [JP] Japan ................... 61-251173

[51] Int. Cl.$^4$ .............................................. B65G 53/52
[52] U.S. Cl. ...................................... 406/195; 406/197
[58] Field of Search ................ 406/197, 191, 195, 50, 406/34, 184, 83, 85, 192, 1, 19, 31, 37

[56] References Cited

U.S. PATENT DOCUMENTS

| 4,529,337 | 7/1985 | Hilgraf et al. | 406/195 |
| 4,592,679 | 6/1986 | Boiting et al. | 406/197 |
| 4,603,810 | 8/1986 | Schleimer et al. | 406/195 |

FOREIGN PATENT DOCUMENTS 1245523  7/1986  U.S.S.R. ................... 406/195

Primary Examiner—Joseph F. Peters, Jr.
Assistant Examiner—Edwin L. Swinehart
Attorney, Agent, or Firm—Koda & Androlia

[57] ABSTRACT

An improved and the related system for pneumatically transporting a powder or granular material placed in an airtight storage container through a transport pipe in high density. The material is formed into a long column in a horizontal upper pipe of the transport pipe and is transported at very slow speed and in high density by being performed such operation that the material is first increased and then reduced in speed and again accelerated while being moved up through a vertical riser pipe connected to the horizontal pipe and is once more reduced in speed when the material enters the horizontal upper pipe.

3 Claims, 2 Drawing Sheets

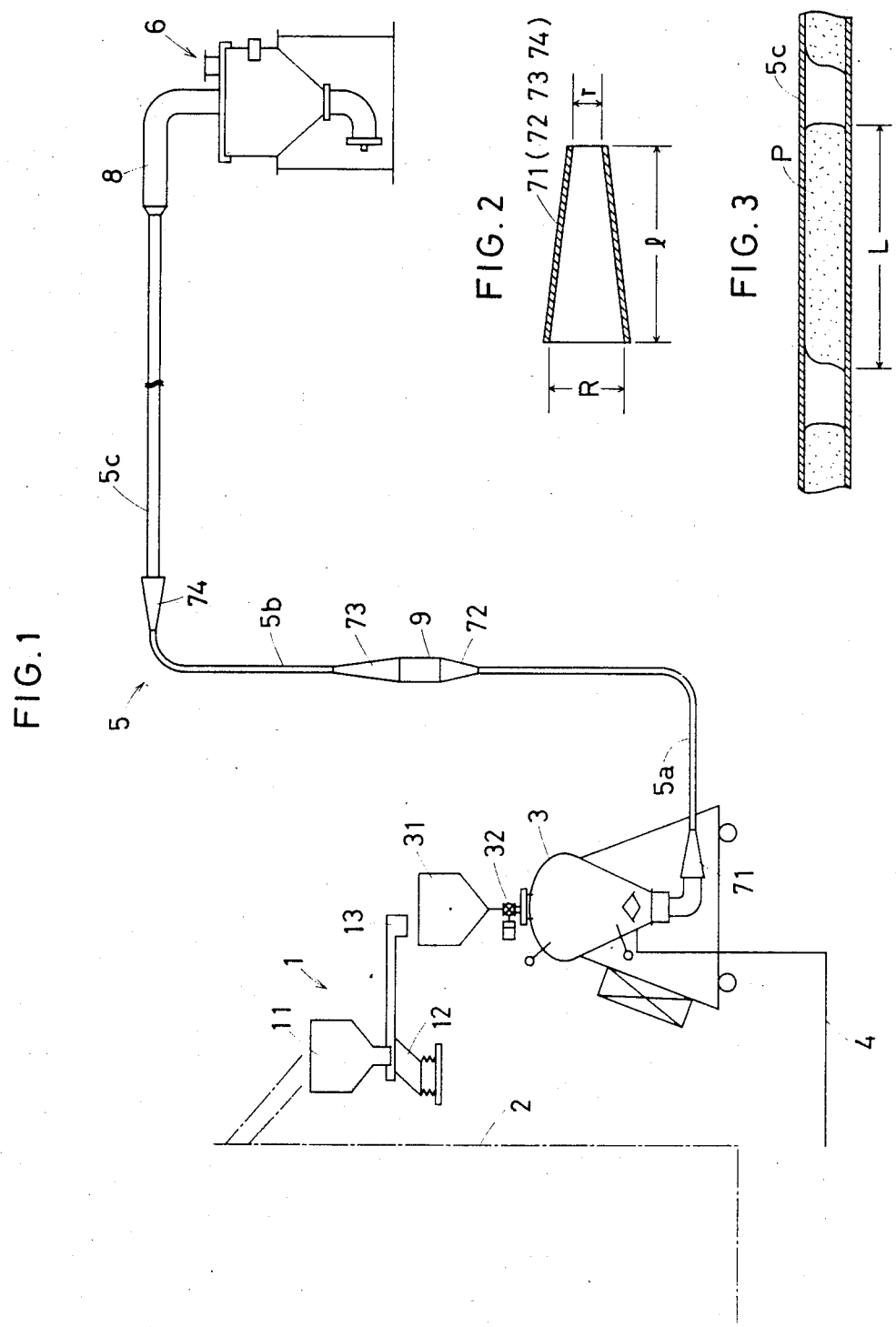

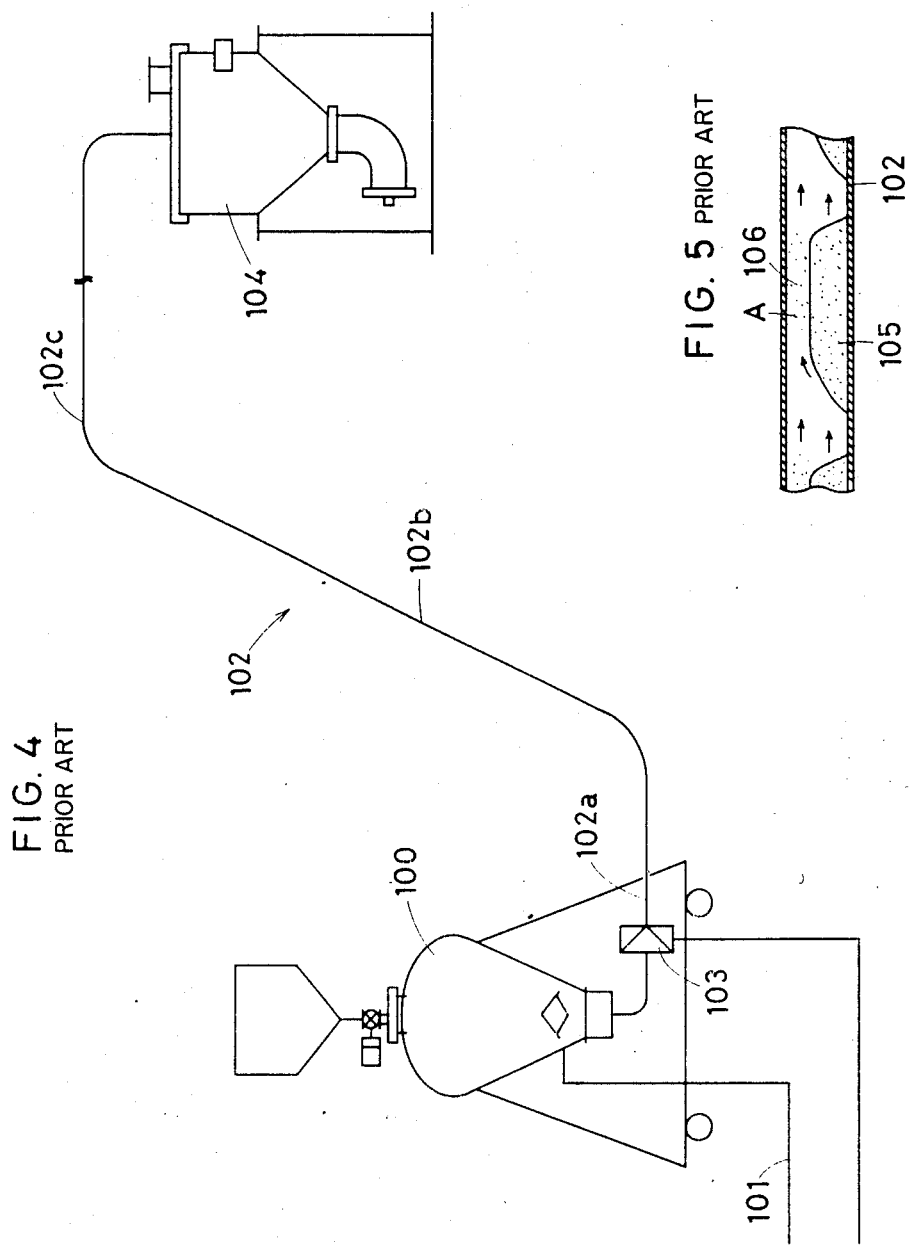

HIGH-DENSITY PNEUMATIC TRANSPORT METHOD FOR USE IN POWDER OR GRANULAR MATERIAL AND SYSTEM FOR PRACTISING THE METHOD

BACKGROUND OF THE INVENTION

I. Field of the Invention

The present invention relates to an improved method and the related system for pneumatically transporting a powder or granular material in high density, and more particularly to a method of pneumatically transporting a powder or granular material contained in an airtight storage container efficiently to a collector at very slow speed while forming the material into a long column inside a transport pipe and to a system for practising the method.

II. Prior Art

FIG. 4 shows a powder or granular pneumatic transport system of a general type conventionally used. The system is of the construction in which the powder or granular material placed in an airtight storage container 100 is transferred from the container to a lower pipe 102a of a transport pipe 102 by the gas supplied from a gas feed pipe 101, and the material is formed into a plug-shaped material by supplying pressurized gas from a pressure nozzle 103 disposed intermediately of the lower pipe 102a, the plug-shaped material is pneumatically transported through an inclined pipe 102b of the transport pipe 102 through an upper pipe 102c and is finally received by a collector 104.

However, when the powder or granular material is pneumatically transported in the form of a plug by the system described above, clearance 106 is often formed above the plug-shaped material while it passes through the transport pipe 102 (see FIG. 5), with the result that the material A on the surface of the plug-shaped material 105 is first transferred and the plug shape is broken. Thus that eventually results in unsatisfactory transfer.

Moreover, since any of those conventional systems as described above transfers the plug-shaped material at an extremely fast speed like several meters per second for example, the material is obliged to incur strong shock when being received by the collector 104, thus easily incurring severe damage or disintegration.

Furthermore, that causes another problem of mutual collision between the powder or granular materials inside the transport pipe 102.

Accordingly, when the method above mentioned is applied to transporting of medicine tablets which are comparatively liable to break, a production rate of defectives tends to increase.

SUMMARY OF THE INVENTION

Accordingly, a primary object of the invention is to provide an improved method capable of pneumatically transporting a powder or granular material in high density without imparting impulse to the material or causing segregation of the material.

Another object of the invention is to provide an improved system capable of pneumatically transporting a powder or granular material in high density efficiently without imparting impulse to the material or causing segregation thereof.

The above objects are achieved by the invention, and the invention is characterized in that it includes the following active steps.

Namely, in the first step, the powder or granular material in an airtight storage container is fed under pressure to a lower pipe, and in the second step, immediately thereafter, the material thus fed into the lower pipe is accelerated. In the third step, the material is moved upward inside a vertical riser pipe connected to the lower pipe, while being once reduced in speed and being again increased in speed midway through its vertically upward transport. In the fourth step, the material thus moved up is again reduced in speed as soon as it enters a horizontal upper pipe connected to the vertical riser pipe, whereby the material is successively formed into a long column inside the horizontal upper pipe and is pneumatically transported to the collector at very slow speed. And in the final step, the material which has been transported in the form of a long column is received into the collector in the state of substantially gravitational fall.

According to the invention, the material is successively formed into a long column and is pneumatically transported at very slow speed and is finally received into the collector disposed at the terminal end of the transport pipe in the state of substantially gravitational fall.

At the same time, the system proposed by the invention comprises, in combination, an airtight storage container containing a powder or granular material therein, a transport pipe which the powder or granular material passes through, and a collector, characterised in that the transport pipe comprises a lower transport pipe with a accelerating reducer, the pipe being connected to the airtight storage container, a horizontal upper pipe with a decelerating reducers at the initial end thereof, the pipe being connected to the collector, and a vertical riser pipe with an accelerating and a decelerating reducer in pairs, the pipe being connecting the lower pipe to the horizontal pipe, in that the system further comprises a speed reduction means for reducing the speed of the material which has been transported in the form of a long column so that the material is received into the collector in the state of substantially gravitational fall.

In a preferred embodiment, the lower pipe has a convergent cylinder as an accelerating reducer, the horizontal pipe has a divergent cylinder as a deceralating reducer disposed at the initial end thereof, and the vertical riser pipe has a divergent cylinder as a decelerating reducer and a convergent cylinder as an accelerating reducer in pairs.

BRIEF DESCRIPTION OF THE DRAWINGS

Other objects and advantages of the invention will be apparent from the following description, the appending claims and the accompanying drawings, wherein:

FIG. 1 is a schematic diagram of a preferred embodiment of the system of the invention;

FIG. 2 is a sectional view of a reducer;

FIG. 3 is a fragmentary section of the transport pipe, explaining how the powder or granular material in the horizontal pipe is pneumatically transported;

FIG. 4 is a schematic diagram of a conventional system; and

FIG. 5 is a fragmentary section of the transport pipe, explaining how the material in the conventional system is transported.

DETAILED DESCRIPTION OF THE INVENTION

The invention will be described in detail with reference to a preferred embodiment thereof.

FIG. 1 is a schematic diagram showing one embodiment of the system of the invention. In the system, compression air is used as transport gas, and medicine tablets are used as a powder or granular material to be transported respectively.

In FIG. 1, the numeral 1 designates a feeder having a hopper 11. The hopper 11 is designed to store tablets fed from a compression molding machine 2 therein. The tablets stored in the hopper 11 are supplied to a hopper 31 for an airtight storage container 3 through a trough 13 by driving a magnetic vibrator 12 disposed below the hopper 11.

The airtight storage container 3 has a valve 32 between the container 3 and the hopper 31. When the valve 32 is opened, the tablets stored in the hopper 31 are fed into the container 3. The opening and closing of the valve 32 is controlled in interlocking relation with the magnetic vibrator 12 of the feeder 1 in such a manner that the valve 32 is closed when the tablets in the container 3 are took out into a lower pipe 5a of transport pipe 5 and is opened when the tablets are supplied from the feeder 1.

A gas feed pipe 4 is connected to the container 3 and the tablets in the container 3 are took out under pressure into the lower pipe 5a of the transport pipe 5 by supplying compression air from the pipe 4.

The transport pipe 5 includes a horizontal lower pipe 5a connected to the delivery outlet at the lower end of the container 3, a horizontal upper pipe 5c connected to the upper end inlet of a collector 6, and a vertical riser pipe 5b connecting the pipe 5a to the pipe 5c.

A convergent cylinder constituting an accelerating reducer 71 is disposed intermediately of the lower pipe 5a, a divergent cylinder constituting a decelerating reducer 72 and a convergent cylinder constituting an accelerating reducer 73 thereabove are disposed intermediately of the vertical riser pipe 5b, and a divergent cylinder constituting a decelerating reducer 74 is disposed at the initial end of the horizontal pipe 5c, and a decelerating elbow pipe 8 with an enlarged caliber larger than that of the horizontal pipe 5c, is provided at the terminal end of the pipe 5c.

As shown in FIG. 2, the suitable size of the accelerating or decelerating reducer 71,(72,73) may be set such that the caliber R of a large one is about 1.5 times as large as the caliber r of a small one and the length 1 of the reducer is about 4 to 20 times as long as the caliber r of small one. Reducers 37.5 mm in larger caliber R, 25 mm in smaller caliber r, and 250 to 500 mm in length 1 may be used in a preferred embodiment.

The numeral 9 designates a sight glass for watching how the powder or granular material is transferred in the transport pipe. The glass 9 is disposed between the reducers 72 and 73 at the midway point of the vertical riser pipe 5b.

The method of the invention is performed by the system of the construction described above in the following manner.

The tablets in the container 3 are took out under pressure from the container 3 to the lower pipe 5a by supplying compression air from the gas feed pipe 4, and immediately thereafter, the material is accelerated by means of the accelerating reducer 71 and then the material is moved upward in the vertical riser pipe 5b in the state of the material filling the pipe in high density to a degree just before of blocking the pipe. On the way of its upward transport, the material is once decelerated by the decelerating reducer 72 and is accelerated again by the accelerating reducer 73 with the material held in high density. As a result that the material gets sufficient pushing force to continue to move up toward the upper pipe 5c.

However, in this case, without reducers 72, 73, the tablets in transit would be broken by receipt of impulse in the middle of the riser pipe 5b and would move partly upward and partly downward. That makes it difficult for the material to reach the horizontal upper pipe 5c without chips nor cracks. In this way, the tablets are moved up toward the horizontal upper pipe 5c and are decelerated again by the decelerating reducer 74 at the initial end of the horizontal upper pipe 5c just after the change of their course when the tablets enter the horizontal upper pipe 5c, as the result that the tablets are gathered in the form of a long column P as shown in FIG. 3, and are pneumatically transferred to the collector 6 at very slow speed through the horizontal upper pipe 5c with no clearance in the pipe 5c.

Accordingly, the tablets forming the surface layer of the column P are not transferred first to brake the column nor mutual collision among the tablets does not occur in the horizontal upper pipe 5c to be thereby broken.

And according to the invention, since the tablets thus transported in the form of a long column and at very slow speed through the horizontal upper pipe 5c are further decelerated by a elbow 8 with an enlarged caliber at the terminal end of the pipe 5c, the tablets are finally dropped substantially gravitationally into a collector 6. As a result it makes possible to result in pneumatically transporting of the tablets without chips nor cracks.

It should note that the length of the column P tends to become longer in proportion to the length of the horizontal upper pipe 5c. Experiments having been conducted by the present inventors showed that when the pipe 5c was 5 meters long, the column length L became more than one meter, and when the pipe 5c was 20 meters long, the column length L became more than about three meters. And the experiments also showed that the transport speed of the material was slowed down to about 0.1 m/sec.

In the embodiment described above, a description has been given of the case wherein the tablets are used as an example of a powder or granular material. Besides the description, the invention may be applicable to the pneumatic transport of candies, electric or electronic parts and compression moldings, powder, granules, and other solid materials.

And it should be understood that, besides the compression air used in the above embodiment, inert non-poisonous gas such as nitrogen, carbon dioxide may be also used.

As apparent from the description so far given, the invention may make it possible to pneumatically transport the powder or granular material at very slow speed without chips nor cracks. And inexpensive reducers may be employed in place of expensive transport pressure nozzles which are indispensable for conventional system. Consequently, the invention may remarkably reduce expenses for the whole of the system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A high density pneumatic transport method of pneumatically transporting a powder or granular material placed in an airtight storage container to a collector through a transport pipe by the use of pressurized gas, the method comprising the steps of:

supplying the pressurized gas to the airtight storage container so as to take the material out of the container under pressure and feed the material into a lower horizontal pipe of the transport pipe;

increasing the speed of the material in the lower horizontal pipe;

moving the material in high density in a vertical raiser pipe connected to the lower pipe;

reducing the speed of the material and again increasing the speed of the material midway through its vertically upward transfer inside the vertical pipe;

shifting the direction of the material in high density to a horizontal direction by means of a upper horizontal pipe connected to the vertical pipe;

immediately thereafter reducing the speed of the material in the upper horizontal pipe whereby the material is successively formed into a long column inside the upper horizontal pipe and pneumatically transported to the collector at very slow speed; and receiving the material which has been transported in the form of a long column into the collector under substantially gravitational fall.

2. A high density pneumatic transport system for pneumatically transporting a powder or granular material placed in an airtight storage container to a collector through a transport pipe by the use of pressurized gas, said system comprising:

a means for supplying the pressurized gas to the airtight storage container so as to take the material out of the container under pressure and feed the material into a lower horizontal pipe of said transport pipe;

a means for increasing the speed of the material in the lower horizontal pipe and the density to a high density to a degree just before blocking the lower horizontal pipe, said means comprising a convergent pipe;

a means for moving the material in high density into a vertical riser pipe of the transport pipe which is connected to the lower horizontal pipe;

a means for reducing the speed of the material and again increasing the speed of the material midway through its vertical upward transfer inside the vertical riser pipe of the transport pipe to provide sufficient pushing force to said material to cause said material to move upwardly in said vertical pipe, said means comprising a divergent pipe for gradually reducing the speed of the material and a convergent pipe disposed above said divergent pipe for gradually increasing the speed of the material;

a means for shifting the direction of the material in high density to a horizontal direction into an upper horizontal pipe of the transport pipe which is connected to the vertical riser pipe;

a means for reducing the speed of the material in the upper horizontal pipe immediately after the direction of the material is shifted to the horizontal direction whereby the material is successively formed into a long column inside the upper horizontal pipe and pneumatically transported to the collector pipe at a very low speed, said means comprising a divergent pipe;

a speed reducing means disposed at an end of said upper horizontal pipe for reducing the speed of the material thus transported in the form of a long column in said upper horizontal pipe to a degree of gravitational fall; and a means for receiving the material which has been transported in the form of a long column in the upper horizontal pipe into the collector under substantially gravitational fall.

3. A high density pneumatic transport system according to claim 2 wherein a large caliber of said convergent or divergent pipes is 1.5 times as large as a small caliber of said convergent or divergent pipes and a length of said convergent or divergent pipes is 4 to 20 times as long as said small caliber.

* * * * *